(12) United States Patent
Hsiao et al.

(10) Patent No.: US 11,524,484 B1
(45) Date of Patent: Dec. 13, 2022

(54) TRANSPARENT HEAT-INSULATING FILM

(71) Applicant: Cambrios Film Solutions Corporation, Tortola (VG)

(72) Inventors: Chung-Chin Hsiao, Hsinchu County (TW); Siou-Cheng Lien, Miaoli County (TW); Ko-Hsin Chang, Taoyuan (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 17/347,644

(22) Filed: Jun. 15, 2021

(51) Int. Cl.
*B32B 3/00* (2006.01)
*B32B 7/023* (2019.01)
*B32B 7/12* (2006.01)

(52) U.S. Cl.
CPC .............. *B32B 7/023* (2019.01); *B32B 7/12* (2013.01); *B32B 2255/205* (2013.01); *B32B 2255/26* (2013.01); *B32B 2255/28* (2013.01); *B32B 2307/202* (2013.01); *B32B 2307/304* (2013.01); *B32B 2307/412* (2013.01); *B32B 2307/418* (2013.01); *B32B 2307/536* (2013.01); *B32B 2457/208* (2013.01)

(58) Field of Classification Search
CPC ........... B32B 7/023; B32B 7/027; B32B 7/12; B32B 2457/208; B32B 2307/202
See application file for complete search history.

(56) References Cited

FOREIGN PATENT DOCUMENTS

| CN | 103854723 A | 6/2014 |
| CN | 109716179 A | 5/2019 |
| CN | 110415865 A | 11/2019 |
| JP | 2014019273 A | 2/2014 |
| JP | 2014026071 A | 2/2014 |
| JP | 2019104110 A | 6/2019 |
| KR | 20140033566 A | * 3/2014 |
| WO | 2018074527 A1 | 4/2018 |

\* cited by examiner

*Primary Examiner* — Elizabeth E Mulvaney
(74) *Attorney, Agent, or Firm* — Cooper Legal Group, LLC

(57) ABSTRACT

A transparent heat-insulating film is provided, wherein the transparent heat-insulating film includes a base layer including a first surface and a second surface, a hard-coat layer, a silver nanowire layer, and a protective layer including an inner surface and an outer surface. The hard-coat layer and the silver nanowire layer are disposed between the first surface of the base layer and the inner surface of the protective layer. A temperature of the second surface of the base layer is T1 (° C.), a temperature of the outer surface of the protective layer is T2 (° C.), and a temperature difference between T1 and T2 (T1−T2) is ΔT. When T1=50-100° C. and the base layer and the protective layer reach thermal equilibrium, $\Delta T = 0.15T1 - 0.35T1$.

16 Claims, 3 Drawing Sheets

TRANSPARENT HEAT-INSULATING FILM

BACKGROUND OF THE DISCLOSURE

1. Field of the Disclosure

The present disclosure relates to a transparent heat-insulating film, particularly, the present disclosure relates to a transparent heat-insulating film applied for a touch panel.

2. Description of Related Art

As electronic devices become more extensive, lighter and thinner outer appearance of the electronic devices are demanded. However, heat dissipation of those thinned electronic devices becomes difficult, so the temperature of the surface of those electronic devices increases significantly, especially for large and thin display panels. Therefore, the heat dissipation problem is still urgent in the process of designing large-scale integrated circuits and packaging electronic equipment.

To solve the heat dissipation problem of such high-heating electronic products, most of the products are equipped with heat-insulating film on the surface of the product to insulate the heat to avoid problems, such as overheating, when the user touches the electronic product. Currently, a metal heat sink with high thermal conductivity is often installed on the surface of the electronic product, and the commonly used heat-conducting metals are silver, copper, aluminum, etc. However, when better heat dissipation or heat-insulating effect is demanded, the amount of heat-conducting metal should be increased. The optical characteristics of the display panel will be affected.

SUMMARY OF THE INVENTION

The present disclosure provides a novel transparent heat-insulating film, which comprises a base layer including a first surface and a second surface, a hard-coat layer, a silver nanowire layer, and a protective layer including an inner surface and an outer surface. The hard-coat layer and the silver nanowire layer are disposed between the first surface of the base layer and the inner surface of the protective layer. A temperature of the second surface of the base layer is T1 (° C.), a temperature of the outer surface of the protective layer is T2 (° C.), and a temperature difference between T1 and T2 (T1−T2) is ΔT. When T1=50-100° C. and both the base layer and the protective layer reach thermal equilibrium, ΔT=0.15T1−0.35T1.

In one embodiment of the present disclosure, a transparency of the transparent heat-insulating film is 85-99%, a haze of the transparent heat-insulating film is 0.5-2.5%, and a reflectance at a wavelength of 550 nm is 0.5-2%.

In one embodiment of the present disclosure, a surface resistance of the silver nanowire layer is 10-150 ops.

In one embodiment of the present disclosure, a time needed for both the second surface of the base layer and the outer surface of the protective layer to reach thermal equilibrium is less than 5 minutes.

In one embodiment of the present disclosure, the hard-coat layer is disposed on the first surface of the base layer, the silver nanowire layer is disposed on the hard-coat layer, and the protective layer is disposed on the silver nanowire layer.

In one embodiment of the present disclosure, the transparent heat-insulating film further comprises an anti-reflective film including an adhesive surface and a touch surface, wherein the anti-reflective film is attached to the outer surface of the protective layer through the adhesive surface of the anti-reflective film.

The present disclosure provides another novel transparent heat-insulating film, which comprises a base layer including a first surface and a second surface, a hard-coat layer, a silver nanowire layer, a protective layer including an inner surface and an outer surface, and an anti-reflective film including an adhesive surface and a touch surface. The inner surface of the protective layer faces the silver nanowire layer. The hard-coat layer and the silver nanowire layer are disposed between the first surface of the base layer and the inner surface of the protective layer, and the anti-reflective film is attached to the outer surface of the protective layer through the adhesive surface. A temperature of the second surface of the base layer is T3 (° C.), a temperature of the touch surface of the anti-reflective film is T4 (° C.), and a temperature difference between T3 and T4 (T3−T4) is ΔT. When T3=50-100° C. and the base layer and the anti-reflective film reach thermal equilibrium, ΔT=0.12T3−0.32T3.

In one embodiment of the present disclosure, a surface resistance of the silver nanowire layer is 10-40 ops.

In one embodiment of the present disclosure, the hard-coat layer is disposed on the first surface of the base layer, the silver nanowire layer is disposed on the hard-coat layer, and the protective layer is disposed on the silver nanowire layer.

In one embodiment of the present disclosure, the anti-reflective film includes a high-refractive layer and a low-refractive layer which are laminated to each other.

In one embodiment of the present disclosure, a refractive index of the high-refractive layer is 1.6-1.7, and a refractive index of the low-refractive layer is 1.3-1.4.

In one embodiment of the present disclosure, a hardness of the transparent heat-insulating film is 2H.

It should be noted that the term "on" in the specification may be used herein to describe the relative positions between components. For example, a first element disposed "on" a second element includes embodiments in which the first element is formed in direct contact with the second element, and may also include embodiments in which additional components may be formed between the first element and the second element.

Furthermore, the terms "thermal equilibrium" in the specification may be used herein to describe a situation in which there is no change in temperature gradient between each layer of the transparent heat-insulating film. For example, in the present disclosure, after the second surface of the base layer is heated to a certain temperature for a period of time, the base layer and the protective layer reach thermal equilibrium when the temperature difference between the outer surface of the protective layer and the second surface of the base layer remains the same.

In the present disclosure, the silver nanowire layer of the transparent heat-insulating film serving as a heat-insulating material has excellent heat-dissipating and heat-insulating effects, excellent optical properties, and high hardness. Also, in a high temperature and high humidity environment, the silver nanowires can be prevented from being damaged and effectively improve storage stability.

DETAILED DESCRIPTION

Figure 1:
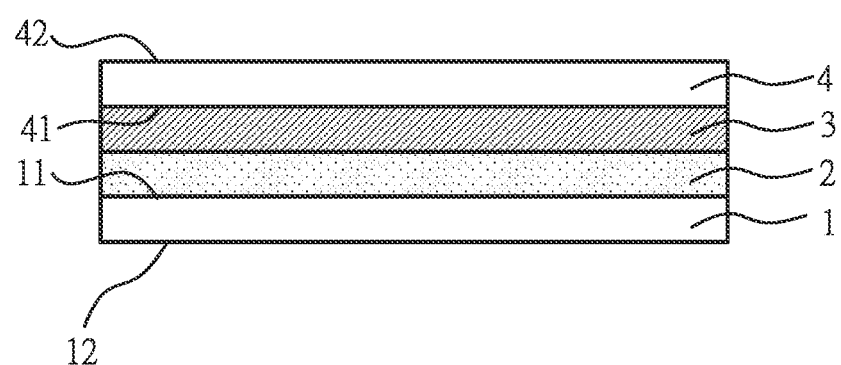
FIG. 1 is a cross-sectional view of the transparent heat-insulating film of the first embodiment of the present disclosure.

First, the cross-sectional view of the transparent heat-insulating film 1000 of the first embodiment of the present disclosure is illustrated in FIG. 1, wherein the transparent heat-insulating film 1000 comprises a base layer 1, a hard-coat layer 2, a silver nanowire layer 3, and a protective layer 4. The base layer 1 has a first surface 11 and a second surface 12. The thickness of the base layer 1 may be 40-100 μm, and the base layer 1 can be made of glass, sapphire, acrylic (PMMA), polyvinyl chloride (PVC), polypropylene (PP), polyethylene terephthalate (PET), polyethylene naphthalate (PEN), poly carbonate (PC), polystyrene (PS), polyimide (Polyimide), cellulose triacetate film (TAC film), and other transparent materials, but the present disclosure is not limited thereto.

The hard-coat layer 2 is formed on the first surface 11 of the base layer 1. The thickness of the hard-coat layer 2 may be 0.5-2.0 μm, and the hard-coat layer 2 can be made by a cured film comprising hardening resins such as melamine resin, urethane resin, alkyd resin, acrylic resin, or silicone resin, but the present disclosure is not limited thereto.

The silver nanowire layer 3 is formed on the hard-coat layer 2, and the surface resistance of the silver nanowire layer 3 may be 10-150 ops (ohm per square, Ω/□).

The protective layer 4 is formed on the silver nanowire layer 3 for protecting the silver nanowire layer 3. The protective layer 4 has an inner surface 41 and an outer surface 42, wherein the inner surface 41 faces and contact with the silver nanowire layer 3. The thickness of the protective layer 4 may be 40-100 nm, and the protective layer 4 can be materials for protective films that known in the art, such as polyester, polyethylene terephthalate (PET), polybutylene terephthalate (PBT), polymethyl methacrylate (PMMA), acrylic resin, polycarbonate (PC), polystyrene ethylene (PS), polyvinyl chloride (PVC), polyvinyl alcohol (PVA), polyvinylidene chloride (PVDC), polyethylene (PE), ethylene-vinyl acetate copolymer (EVA), polyurethane (PU), cellophane, polyolefin, cyclic olefin copolymer (COP), polytetrafluoroethylene (PTFE), or mixtures thereof.

Figure 2:
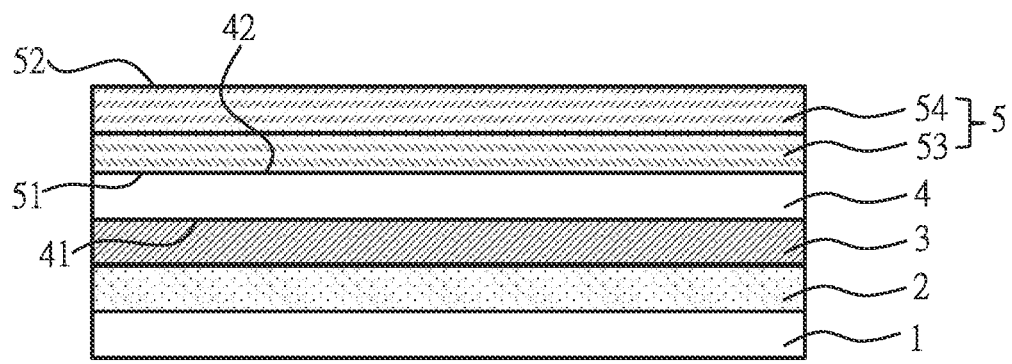
FIG. 2 is a cross-sectional view of the transparent heat-insulating film of the second embodiment of the present disclosure.

The cross-sectional view of the transparent heat-insulating film 2000 of the second embodiment of the present disclosure is illustrated in FIG. 2, wherein the transparent heat-insulating film 2000 comprises a base layer 1, a hard-coat layer 2, a silver nanowire layer 3, a protective layer 4, and an anti-reflective film 5.

In the second embodiment of the present disclosure, the base layer 1, the hard-coat layer 2, the silver nanowire layer 3, and the protective layer 4 are similar to those described in the first embodiment, however, the anti-reflective film 5 is disposed on the outer surface 42 of the protective layer 4.

The anti-reflective film 5 has an adhesive surface 51 and a touch surface 52, wherein the adhesive surface 51 is attached to the outer surface 42 of the protective layer 4. The anti-reflective film 5 may be a laminated structure comprising a high-refractive layer 53 and a low-refractive layer 54, wherein the refractive index of the high-refractive layer 53 may be 1.6-1.7, and the thickness of the high-refractive layer 53 may be 50-100 nm; the refractive index of the low-refractive layer 54 may be 1.3-1.4, and the thickness of the low-refractive layer 54 may be 100-200 nm. The high-refractive layer 53 and the low-refractive layer 54 are disposed to adjust the optical properties of the transparent heat-insulating film 2000.

Evaluation of Optical Properties and Heat-Insulating Effect of the Transparent Heat-Insulating Film Firstly, laminated structures each comprising a base layer, a hard-coat layer, and a silver nanowire layer, which are sequentially stacked, are provided, wherein the silver nanowire layer having surface resistances of <10, 15, 20, and 150 ops due to different amount of silver nanowires are provided as Example 1 to Example 4, respectively. A laminated structure comprising a base layer, a hard-coat layer, a high-refractive layer, and a low-refractive layer, which are sequentially stacked, is provided as Comparative example 1. Transparency, haze, and reflectance of the laminated structure of Example 1 to Example 4 and Comparative example 1 are tested in the present evaluation. Also, the evaluation method of the heat insulating effect is performed by attaching the second surface of the base layer of Examples 1-4 and Comparative example 1 to a constant temperature heating plate, which is set to be 50° C. (T1). After thermal equilibrium, the temperature (T2) of the exposed surfaces of the silver nanowire layer of Example 1 to Example 4 and the low-refractive layer of Comparative example 1 are measured with a thermal imager (infrared (IR) camera). The heat-insulating effects are evaluated according to the temperature differences (ΔT) between the two sides. The evaluation results are shown in Table 1. It should be noted that when the surface resistance of the silver nanowire layer is less than 10 ops, the amount of silver nanowires in the silver nanowire layer may affect the visibility of the transparent heat-insulating film. On the contrary, when the surface resistance of the silver nanowire layer is greater than 150 ops, the heat insulating effect is inefficient.

TABLE 1

|  | Comparative example 1 | Example 1 | Example 2 | Example 3 | Example 4 |
|---|---|---|---|---|---|
| Surface resistance (ops) | — | <10 | 15 | 20 | 150 |
| Transparency (%) | 96.8 | 87.6 | 91.1 | 91.6 | 92.9 |
| Haze (%) | 0.24 | 3.83 | 2.80 | 1.70 | 0.70 |
| Reflectance (%) (550 nm) | 0.17 | 2.62 | 1.99 | 1.10 | 0.49 |
| ΔT (° C.) | 0.4 | 16.0 | 13.1 | 14.0 | 7.7 |

To fulfill the demand of the heat-insulating effect and the visibility of the transparent heat-insulating film, the surface resistance of the silver nanowire layer is preferably 15-150 ops, more preferably 15-50 ops, and most preferably 15-25 ops, so that the optical properties, including 85-99% transparency, 0.5-2.5% haze, and 0.5-2% reflectance (550 nm), may be achieved.

Next, the transparent heat-insulating film having the silver nanowire layer with 25 ops is provided as Example 5. The second surface of its base layer is heated to 50° C., 60° C., 70° C., 80° C., 90° C., 100° C., and 110° C. (temperature of the heating plate, T1), while the exposed temperature of the silver nanowire layer (T2) is measured after thermal equilibrium is reached. The temperature difference ΔT is calculated for evaluating the heat-insulating effect, and the results are shown in Table 2.

TABLE 2

| T1 (° C.) | 50 | 60 | 70 | 80 | 90 | 100 | 110 |
|---|---|---|---|---|---|---|---|
| Surface resistance (ops) | | | | 25 | | | |
| ΔT (° C.) | 13.3 | 17.3 | 2E3 | 25.3 | 29.3 | 33.3 | 37.3 |

According to the results shown in Tables 1-2, there is a relationship ΔT (° C.)=0.15 T1−0.35T1 between the heating plate temperature T1 and the temperature difference ΔT based on the transparent heat-insulating film having the silver nanowire layer.

According to the results of the abovementioned evaluation, the transparent heat-insulating film having the silver nanowire has an excellent heat-insulating effect; also, the time needed to reach thermal equilibrium is quite short, the temperature difference between the two sides may remain constant in 5 minutes. Also, the temperature difference between the two sides may be adjusted to 7.7-16° C. by the amount of the silver nanowires (surface resistance) in the silver nanowire layer. That is, when the temperature of the second surface of the base layer of the transparent heat-insulating film is raised to 50° C., the temperature of the other side of the transparent heat-insulating film may be maintained to 34-42.3° C. Even when the temperature of the second surface of the base layer is raised to 60-110° C., the temperature difference between the two sides of the transparent heat-insulating film may be 17.3-37.7° C. On the contrary, the temperature difference between the two sides of the transparent heat-insulating film without the silver nanowire layer of the Comparative example 1 is only 0.4° C., which shows a poor heat-insulating effect. In addition, the transparent heat-insulating films of Example 1 to Example 4 have excellent optical properties, wherein the transparency thereof is 87.6-92.9%, the haze thereof is <4%, and the reflectance thereof is <3%.

Next, a transparent heat-insulating film comprising a base layer, hard-coat layer, a silver nanowire layer, a protective layer, and an anti-reflective layer, which are sequentially stacked, is provided. The anti-reflective layer includes a high-refractive layer and a low-refractive layer, wherein the refractive index of the high-refractive layer is 1.628, and the refractive index of the low-refractive layer is 1.380. The transparent heat-insulating films having the silver nanowire layer having surface resistances of 10, 20, 40 ops are provided as Example 6 to Example 8, respectively. The aforementioned Comparative example 1 is also provided for comparison. The optical properties and the heat insulating effect of Example 6 to Example 8 and the aforementioned Comparative example 1 are evaluated by methods similar to the above. That is, the heat insulating effect thereof is evaluated by heating the second surface of the base layer to 50° C. (T3 (° C.), temperature of the heating plate) and measure the temperature T4 (° C.) of the touch surface of the anti-reflective film after thermal equilibrium is reached. The results of the evaluation are shown in Table 3.

TABLE 3

| | Comparative example 1 | Example 6 | Example 7 | Example 8 |
|---|---|---|---|---|
| Thickness of the anti-reflective layer (nm) | 120/200 | 110/170 | 110/160 | 120/190 |
| Low-refractive layer/high-refractive layer Surface resistance (ops) | — | 10 | 20 | 40 |
| Transparency (%) | 96.8 | 91.1 | 94.2 | 95.5 |
| Haze (%) | 0.24 | 2.18 | 1.10 | 0.71 |
| Reflective index (%) (550 nm) | 0.17 | 1.84 | 1.08 | 0.65 |
| ΔT (° C.) (T3-T4) | 0.4 | 15.7 | 11.4 | 6.2 |

According to the results shown in Table 3, the transparent heat-insulating films comprising the anti-reflective layer of Example 6 to Example 8 show excellent heat-insulating effect, wherein the temperature difference between two sides reaches 6.2-15.7° C. Therefore, when the user operates the touch panel and touches the touch surface of the transparent heat-insulating film, the user will not feel the heat. Also, the optical properties are further improved, wherein the transparency is 91.1-95.5%, the haze is <2.18%, and the reflective index is <2%.

In order to meet the requirements of the heat-insulating effect of the transparent heat-insulating film, the surface resistance of the silver nanowire layer comprised in the transparent heat-insulating film is preferably 10-40 ops, more preferably 10-25 ops, and most preferably 20-25 ops. Simultaneously, the requirements of the optical visibility of the transparent heat-insulating film, such as 85-99% transparency, 0.5-2.5% haze, and 0.5-2% reflective index under 550 nm wavelength, are also reached.

The transparent heat-insulating film comprising the silver nanowire having a surface resistance of 25 ops is provided as Example 9 for the heat-insulating effect evaluation. The heat-insulating effect is evaluated by methods similar to the above. That is, the heat insulating effect thereof is evaluated by heating the second surface of the base layer to 50° C., 60° C., 70° C., 80° C., 90° C., 100° C., 110° C. (T3 (° C.), temperature of the heating plate) and measure the temperature T4 (° C.) of the touch surface of the anti-reflective film after thermal equilibrium is reached. The results of the evaluation are shown in Table 4.

TABLE 4

| T3 (° C.) | 50 | 60 | 70 | 80 | 90 | 100 | 110 |
|---|---|---|---|---|---|---|---|
| Surface resistance (ops) | | | | 25 | | | |
| ΔT (T3-T4)(° C.) | 14.1 | 17.6 | 21.1 | 24.7 | 28.2 | 31.7 | 35.2 |

According to the results shown in Table 3-Table 4, there is a relationship ΔT (° C.)=0.12T3−0.32T3 between the heating plate temperature T3 and the temperature difference ΔT based on the transparent heat-insulating film having the silver nanowire layer.

Next, the high-refractive layer and the low-refractive layer with different refractive index are used for optimizing the heat-insulating effect and optical properties of the reflective film of the transparent heat-insulating film. The refractive indexes of the high-refractive film and the low-refractive film and the surface resistance of the silver nanowire layer of Example 10 to Example 13 are shown in Table 5. The optical properties and the heat insulating effect are evaluated by the methods mentioned above. The result is shown in Table 5.

TABLE 5

|  | Example 10 | Example 11 | Example 12 | Example 13 |
|---|---|---|---|---|
| Refractive index of low-refractive layer | 1.380 | 1.383 | 1.383 | 1.383 |
| Refractive index of high-refractive layer | 1.628 | 1.628 | 1.670 | 1.677 |
| Surface resistance (ops) | 20 | 20 | 25 | 25 |
| Transparency (%) | 93.8 | 93.2 | 91.3 | 93.8 |
| Haze (%) | 1.32 | 1.05 | 1.49 | 1.14 |
| Reflectance (%) (550 nm) | 1.16 | 1.00 | 1.00 | 0.73 |
| ΔT (° C.) | 11.6 | 9.1 | 10.7 | 13.2 |

According to the results, all the transparent heat-insulating films of Example 10 to Example 13, which comprise the low-refractive layer and the high-refractive layer with different refractive index, show excellent heat-insulating effect and optical properties, wherein Example 13 shows the best heat-insulating effect and optical properties. In the transparent heat-insulating film of Example 13, the transparency thereof is 93.8%, haze thereof is 1.14%, reflectance is 0.773%, and the temperature difference is 13.2° C. when the refractive index of the low-refractive layer is 1.383, the refractive index of the high-refractive layer is 1.677, and the surface resistance of the silver nanowire layer is 25 ops.

Transparent heat-insulating films each comprising a base layer, a hard-coat layer, a silver nanowire layer, a protective layer, and an anti-reflective film, which are sequentially stacked, are provided as Example 14 and Example 15, wherein the refractive index of the high-refractive layer is 1.677, the refractive index of the low-refractive layer is 1.383, and the surface resistance of the silver nanowire layer is 25 ops and 40 ops respectively. Despite the evaluation of the heat-insulating effect and the optical properties, the hardness, the scratch resistance, and stability of the silver nanowire layer at 85° C. and 85% humidity in high temperature and high humidity environment are also tested. The evaluation result is shown in Table 6 and FIG. 3.

TABLE 6

|  | Example 14 | Example 15 |
|---|---|---|
| Surface resistance (ops) | 25 | 40 |
| Transparency (%) | 94.7 | 95.7 |
| Haze (%) | 1.15 | 0.71 |
| Reflectance (%) (550 nm) | 0.95 | 0.64 |
| ΔT (° C.) | 12.3 | 7.5 |
| Hardness | 2H | 2H |
| Scratch resistance (ΔH ≤ 5%) | 1.5% | 2.3% |

Figure 3:
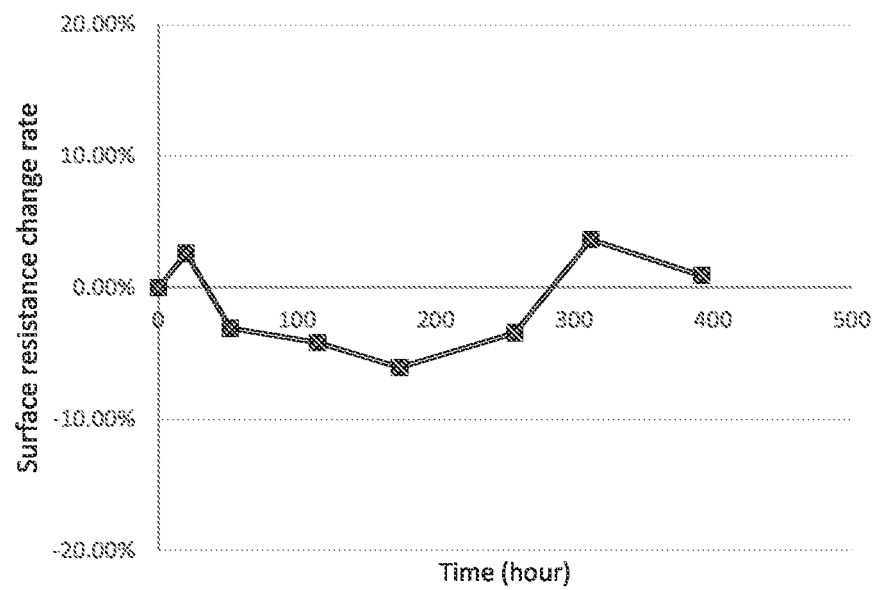
FIG. 3 is a stability test result of the transparent heat-insulating film of the second embodiment of the present disclosure.

According to the evaluation results shown in Table 6 and FIG. 3, the transparent heat-insulating films of Example 14 and Example 15 have excellent heat-insulating effect and optical properties. In addition, the transparent heat-insulating films of Example 14 and Example 15 have high hardness and high scratch resistance. In a high temperature and high humidity environment, the anti-reflective film can prevent the silver nanowire layer from being damaged and improve storage stability of the silver nanowire layer effectively based on the test results of hardness, scratch resistance, and stability of the silver nanowire layer at 85° C. and 85% humidity in high temperature and high humidity environment.

The above disclosure is related to the detailed technical contents and inventive features thereof. People skilled in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A transparent heat-insulating film, comprising:
a base layer including a first surface and a second surface;
a hard-coat layer;
a silver nanowire layer; and
a protective layer including an inner surface and an outer surface;
wherein the hard-coat layer and the silver nanowire layer are disposed between the first surface of the base layer and the inner surface of the protective layer, a temperature of the second surface of the base layer is T1 (° C.), a temperature of the outer surface of the protective layer is T2 (° C.), a temperature difference between T1 and T2 (T1−T2) is ΔT, and when T1=50-100° C. and the base layer and the protective layer reach thermal equilibrium, ΔT=0.15T1-0.35T1.

2. The transparent heat-insulating film of claim 1, wherein a transparency of the transparent heat-insulating film is 85-99%, a haze of the transparent heat-insulating film is 0.5-2.5%, and a reflectance at a wavelength of 550 nm is 0.5-2%.

3. The transparent heat-insulating film of claim 1, wherein a surface resistance of the silver nanowire layer is 10-150 ops.

4. The transparent heat-insulating film of claim 1, wherein a time needed for both the second surface of the base layer and the outer surface of the protective layer to reach thermal equilibrium is less than 5 minutes.

5. The transparent heat-insulating film of claim 1, wherein the hard-coat layer is disposed on the first surface of the base layer, the silver nanowire layer is disposed on the hard-coat layer, and the protective layer is disposed on the silver nanowire layer.

6. The transparent heat-insulating film of claim 1, further comprising an anti-reflective film including an adhesive surface and a touch surface, wherein the anti-reflective film is attached to the outer surface of the protective layer through the adhesive surface of the anti-reflective film.

7. The transparent heat-insulating film of claim 2, further comprising an anti-reflective film including an adhesive surface and a touch surface, wherein the anti-reflective film is attached to the outer surface of the protective layer through the adhesive surface of the anti-reflective film.

8. The transparent heat-insulating film of claim 3, further comprising an anti-reflective film including an adhesive surface and a touch surface, wherein the anti-reflective film is attached to the outer surface of the protective layer through the adhesive surface of the anti-reflective film.

9. The transparent heat-insulating film of claim 4, further comprising an anti-reflective film including an adhesive surface and a touch surface, wherein the anti-reflective film is attached to the outer surface of the protective layer through the adhesive surface of the anti-reflective film.

10. The transparent heat-insulating film of claim 5, further comprising an anti-reflective film including an adhesive surface and a touch surface, wherein the anti-reflective film is attached to the outer surface of the protective layer through the adhesive surface of the anti-reflective film.

11. A transparent heat-insulating film, comprising:
a base layer including a first surface and a second surface;
a hard-coat layer;
a silver nanowire layer;
a protective layer including an inner surface and an outer surface, wherein the inner surface of the protective layer faces the silver nanowire layer; and
an anti-reflective film including an adhesive surface and a touch surface;
wherein the hard-coat layer and the silver nanowire layer are disposed between the first surface of the base layer and the inner surface of the protective layer, the anti-reflective film is attached to the outer surface of the protective layer through the adhesive surface of the anti-reflective film, a temperature of the second surface of the base layer is T3 (° C.), a temperature of the touch surface of the anti-reflective film is T4 (° C.), a temperature difference between T3 and T4 (T3-T4) is $\Delta T$, and when T3=50-100° C. and the base layer and the anti-reflective film reach thermal equilibrium, $\Delta T=0.12T3-0.32T3$.

12. The transparent heat-insulating film of claim 11, wherein a surface resistance of the silver nanowire layer is 10-40 ops.

13. The transparent heat-insulating film of claim 11, wherein the hard-coat layer is disposed on the first surface of the base layer, the silver nanowire layer is disposed on the hard-coat layer, and the protective layer is disposed on the silver nanowire layer.

14. The transparent heat-insulating film of claim 11, wherein the anti-reflective film includes a high-refractive layer and a low-refractive layer which are laminated to each other.

15. The transparent heat-insulating film of claim 14, wherein a refractive index of the high-refractive layer is 1.6-1.7, and a refractive index of the low-refractive layer is 1.3-1.4.

16. The transparent heat-insulating film of claim 14, wherein a hardness of the transparent heat-insulating film is $\geq 2H$.

* * * * *